(12) United States Patent
Dixon

(10) Patent No.: US 6,499,930 B1
(45) Date of Patent: Dec. 31, 2002

(54) GRAIN BIN UNLOADING SYSTEM

(76) Inventor: Carl R. Dixon, 141 Walker La., Weiner, AR (US) 72479

( * ) Notice: Subject to any disclaimer, the term of this patent is extended or adjusted under 35 U.S.C. 154(b) by 0 days.

(21) Appl. No.: 09/954,519

(22) Filed: Sep. 17, 2001

(51) Int. Cl.[7] ............................................. B65G 65/42
(52) U.S. Cl. .................. 414/313; 414/308; 414/309; 414/322; 414/327; 198/520
(58) Field of Search ............................ 414/308, 309, 414/313, 322, 327, 305, 306; 198/519, 520

(56) References Cited

U.S. PATENT DOCUMENTS

| 3,974,908 A | * | 8/1976 | Keichirger | 198/93 |
| 4,008,816 A | | 2/1977 | Harrison | 214/17 |
| 4,516,898 A | * | 5/1985 | Cantenot | 414/309 |
| 4,875,820 A | * | 10/1989 | Lepp et al. | 414/306 |
| 5,048,671 A | * | 9/1991 | Ellsworth | 198/728 |
| 5,167,318 A | | 12/1992 | Siemens | 198/550 |
| 6,039,647 A | | 3/2000 | Weikel | 460/114 |

FOREIGN PATENT DOCUMENTS

| FR | 1032110 | * | 6/1953 | 414/413 |
| JP | 5593737 | * | 7/1980 | 414/405 |

* cited by examiner

Primary Examiner—Steven A. Bratlie
(74) Attorney, Agent, or Firm—Walker, McKenzie & Walker PC

(57) ABSTRACT

An unloading system for a grain bin. The unloading system includes a sweep conveyor for sweeping grain from the interior of the grain bin to a well in the floor of the grain bin. The sweep conveyor includes an elongated frame, a first sprocket at one end of the frame, a second sprocket at the other end of the frame, an endless chain extending between the first and second sprockets, a plurality of spaced apart paddles attached to the chain, and a motor for causing the chain to rotate whereby the paddles will drag or sweep grain to the well in the floor of the grain bin.

6 Claims, 3 Drawing Sheets

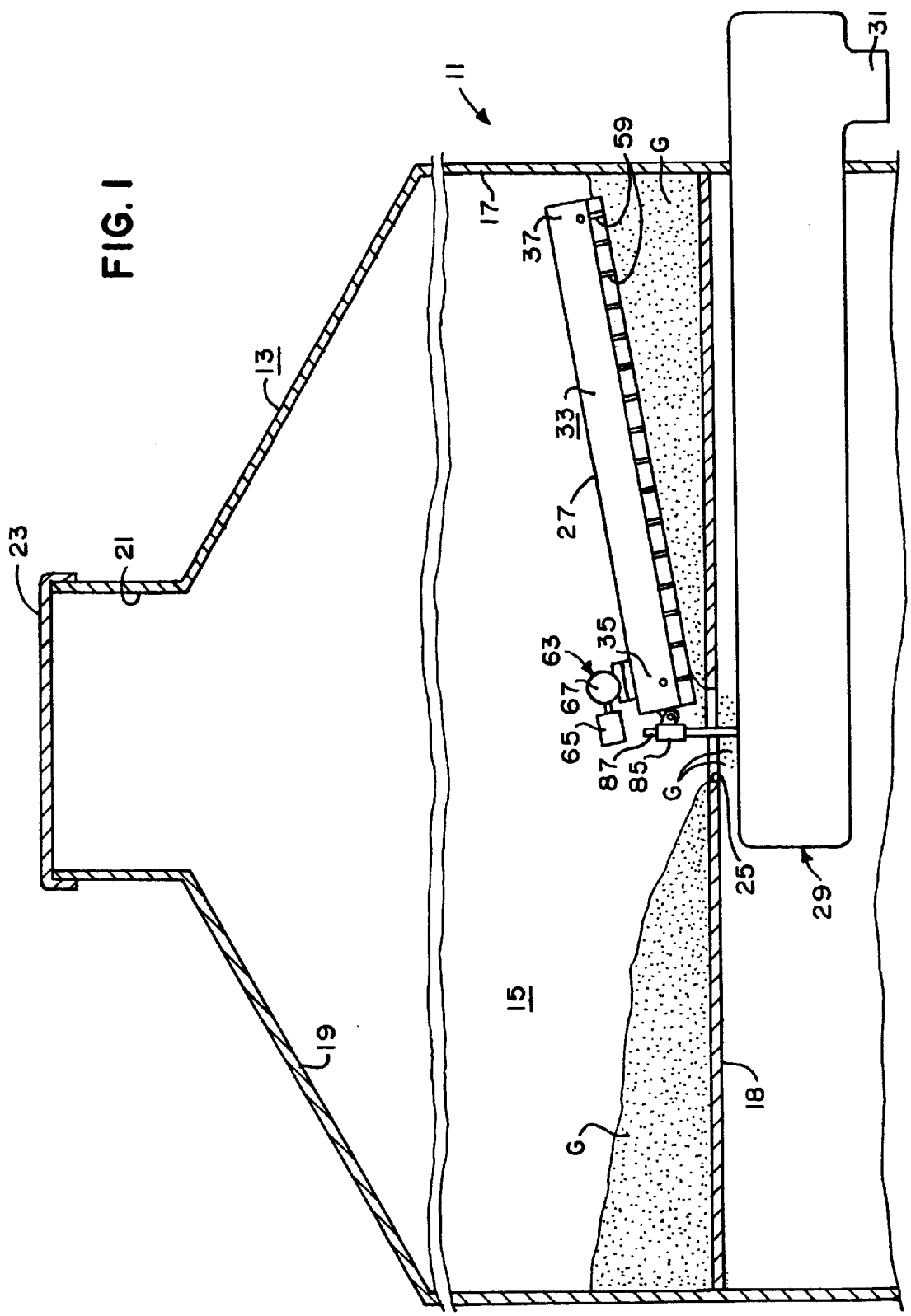

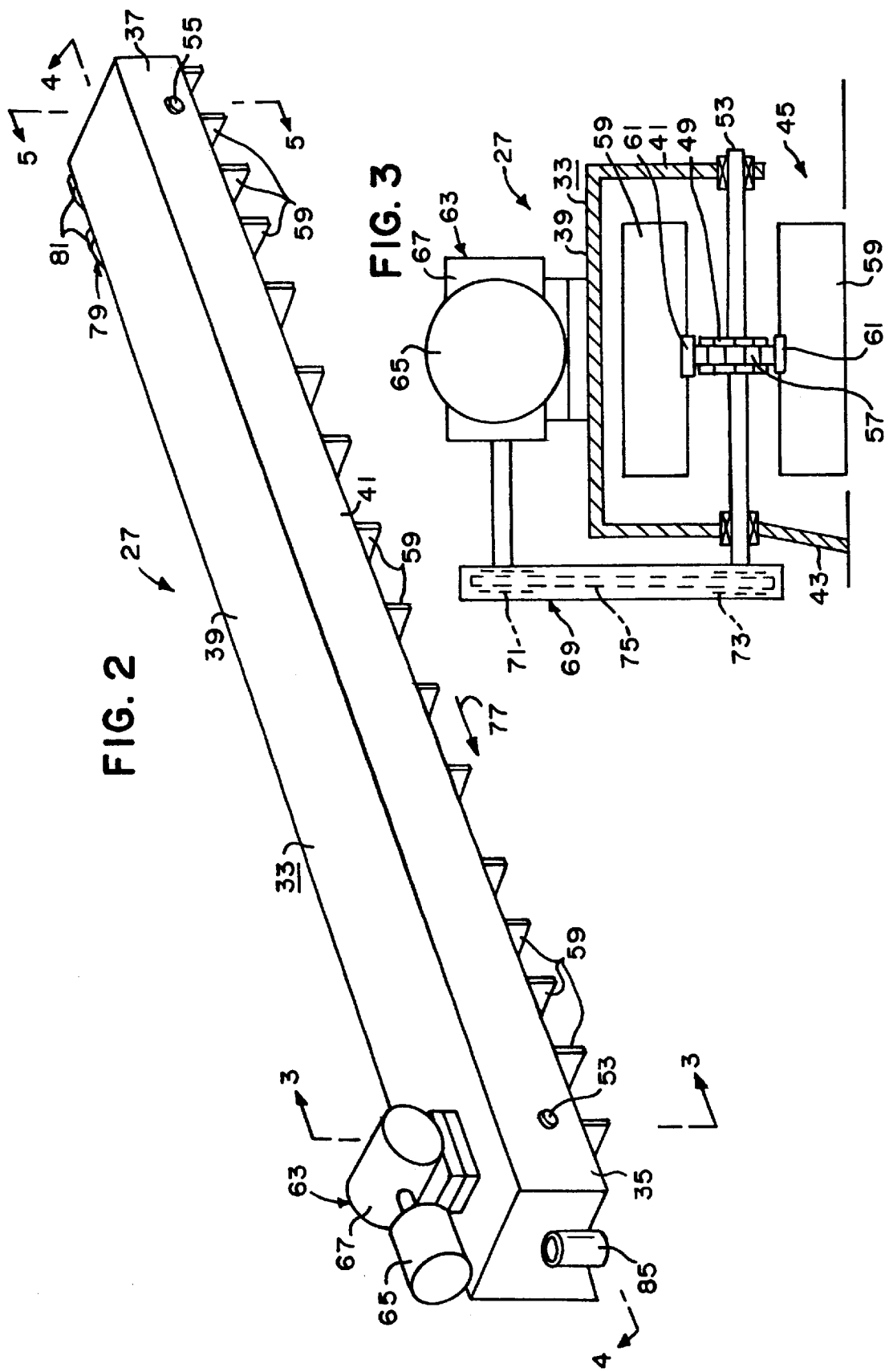

GRAIN BIN UNLOADING SYSTEM

BACKGROUND OF THE INVENTION

1. Field of the Invention

The present invention relates, in general, to a system for unloading grain from a grain bin.

2. Information Disclosure Statement

Systems for unloading grain bins typically include a discharge auger positioned under the floor of the grain bin for conveying grain from a well or sump in the floor of the grain bin to a discharge point outside the grain bin. The grain falls by gravity into the well into the discharge auger. Once the level of grain falls below a certain level, it will no longer fall through the well by gravity. Workers will then have to enter the grain bin and either manually sweep or shovel grain into the well or use a sweep auger positioned above the floor of the grain bin for mechanically conveying grain into the well. The following patents appear to be relevant to the present invention: Harrison, U.S. Pat. No. 4,008,816, issued Feb. 22, 1977; Siemens, U.S. Pat. No. 5,167,318, issued Dec. 1, 1992; and Weikel, U.S; Pat. No. 6,039,647, issued Mar. 21, 2000.

Nothing in the known prior art, either singly or in combination, discloses or suggests the present invention. More specifically, nothing in the prior art discloses or suggests an unloading system including an elongated frame for position on the grain supported on the floor of a grain bin, the frame having a first end and a second end, the first end of the frame being position adjacent a well in the floor of the grain bin; a first wheel rotatably attached to the frame adjacent the first end of the frame; a second wheel rotatably attached to the frame adjacent the second end of the frame; a belt passing about the first and second wheels; a plurality of spaced apart paddles attached to the belt; and power means for rotating one of the wheels to cause the belt to rotate about the first and second wheels and cause the paddles to sweep grain from the floor of the grain bin to the well of the grain bin.

BRIEF SUMMARY OF THE INVENTION

The basic concept of the present invention is to provide a drag chain-type unloading system for unloading grain from the interior of a grain bin.

The unloading system of the present invention includes an elongated frame for position on the grain supported on the floor of a grain bin, the frame having a first end and a second end, the first end of the frame being positioned adjacent a well in the floor of the grain bin; a first wheel rotatably attached to the frame adjacent the first end of the frame; a second wheel rotatably attached to the frame adjacent the second end of the frame; a belt passing about the first and second wheels; a plurality of spaced apart paddles attached to the belt; and power means for rotating one of the wheels to cause the belt to rotate about the first and second wheels and cause the paddles to sweep grain from the floor of the grain bin to the well of the grain bin.

It is an object of the present invention to provide a safe, efficient unloading system for unloading that portion of grain stored within a grain bin that will not fall by gravity into the unloading well.

BRIEF DESCRIPTION OF THE SEVERAL VIEWS OF THE DRAWINGS

FIG. 1 is a somewhat diagrammatic side elevational view of the unloading system of the present invention, shown mounted within a grain bin, portions of the grain bin being broken away for clarity.

FIG. 2 is a somewhat diagrammatic perspective view of a sweep conveyor of the unloading system of the present invention.

FIG. 3 is a sectional view substantially as taken on line 3—3 of FIG. 2, on a larger scale than the scale of FIG. 2 and with portions thereof omitted for clarity.

DETAILED DESCRIPTION OF THE INVENTION

Figure 4:
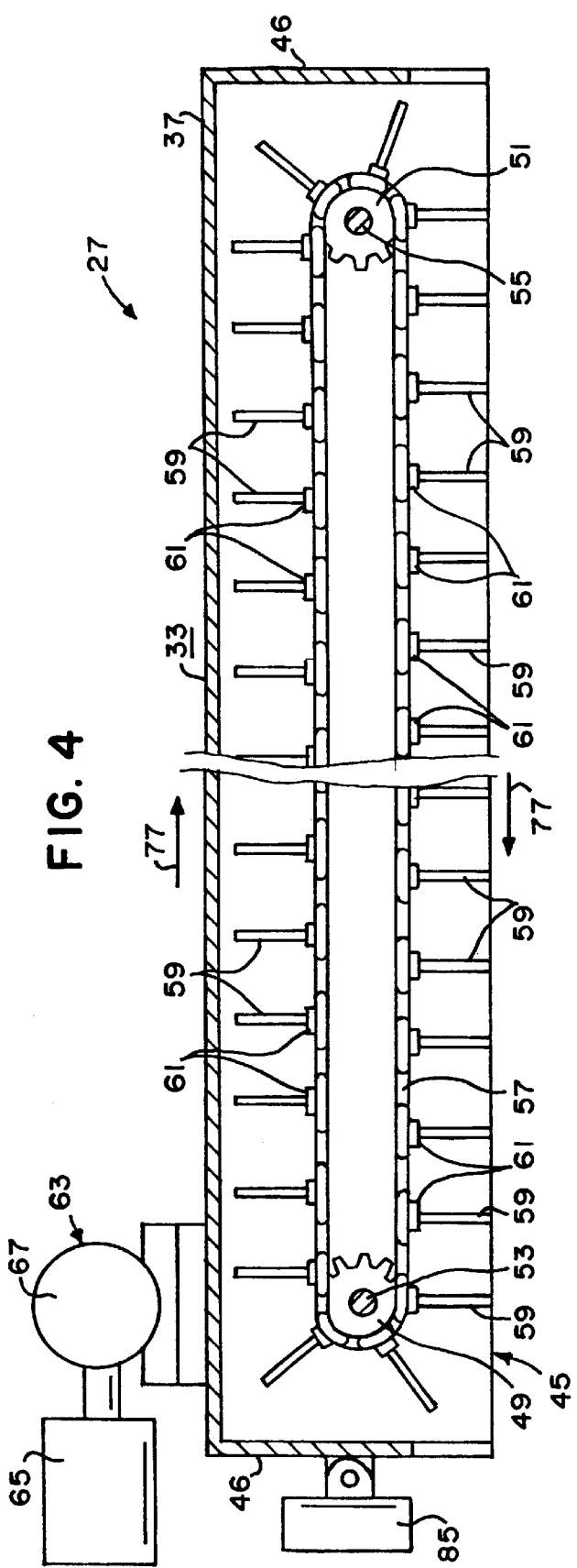
FIG. 4 is a sectional view substantially as taken on line 4—4 of FIG. 2, with portions thereof broken away and omitted for clarity.
Figure 6:
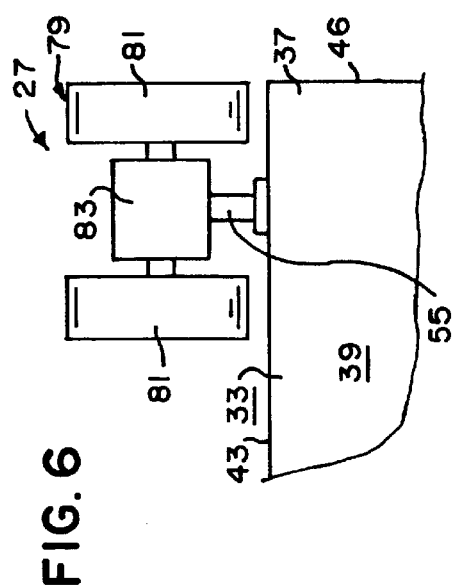
FIG. 6 is a top plan view of a portion of the second end of the sweep conveyor of FIG. 2.
Figure 5:
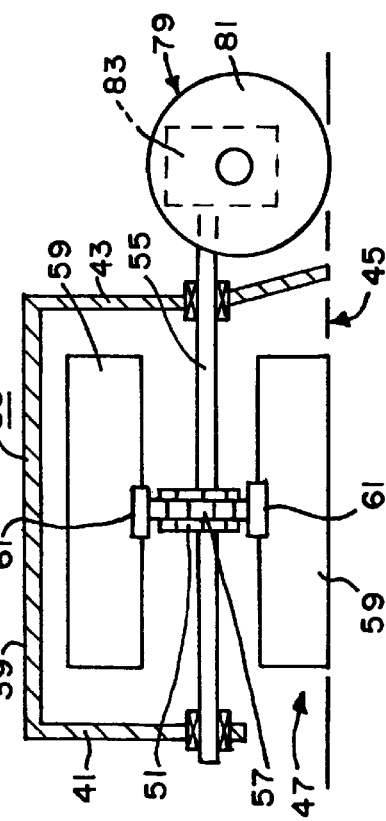
FIG. 5 is a sectional view substantially as taken on line 5—5 of FIG. 2, on a larger scale than the scale of FIG. 2.

The unloading system 11 of the present invention is for a grain bin 13 to unload grain G from the interior 15 of the grain bin 13. The grain bin 13 may be of any typical construction having wall structure 17, floor or floor structure 18 for supporting a quantity of grain G, and a roof structure 19 coacting with the wall and floor structures 17, 18 to define the interior 15. Thus, for example, the grain bin 13 may be constructed of metal with the wall structure 17 having a substantially cylindrical shape and with the roof structure 19 having a substantially conical shape covering the upper end of the cylindrical wall structure 17. The roof structure 19 is provided with a central inlet opening 21 for allowing grain to be introduced into the interior 15 of the grain bin 13 therethrough, and a lid 23 for closing the inlet opening 21 when desired. The floor 18 has at least one well or sump opening 25 therein for allowing grain G to pass therethrough and be unloaded from the interior 15 of the grain bin 13.

The unloading system 11 includes a sweep conveyor 27 positioned above the floor 18 of the grain bin 13 for conveying grain G that does or will not fall by gravity into the well 25 (or wells) thereinto, and a discharge conveyor 29 positioned under the floor 18 of the grain bin 13 for conveying grain G from the well 25 (or wells) in the floor 18 of the grain bin 13 to a discharge point 31 outside the grain bin 13.

The sweep conveyor 27 includes an elongated frame 33 for position on the grain G supported on the floor 18 of the grain bin 13. The frame 33 has a first end 35 for being positioned adjacent the well 25 (or one of the wells 25) in the floor 18 of the grain bin 13, and has a second end 37 for preferably being positioned adjacent the wall structure 17 of the grain bin 13. The frame 33 may consist of an elongated metal hood or shroud member having a top panel 39, a first side wall 41, and a second side wall 43, with an opened bottom 45. End walls 46 are preferably provided to close the opposite ends of the housing member. The lower end of the second side wall 43 preferably extends a greater distance from the top panel 39 than the lower end of the first side wall 41 so that a mouth 47 is created at the lower end of the first side wall 41 for reasons as will hereinafter become apparent. In addition, the lower end of the second side wall 43 may be angled rearwardly or away from the first side wall 41 for reasons as will hereinafter become apparent.

The sweep conveyor 27 includes a first wheel, preferably a first sprocket 49, rotatably attached to the frame 33 adjacent the first end 35 thereof, and a second wheel, preferably a second sprocket 51, rotatably attached to the frame 33 adjacent the second end 37 thereof. A first shaft 52 preferably rotatably extends transversely through the first end 35 of the frame 33 (preferably through the first and second side walls 41, 43) for rotatably attaching the first sprocket 49 to the frame 33, and a second shaft 55 preferably rotatably extends transversely through the second end 37 of the frame 33 (preferably through the first and second side walls 41, 43) for rotatably attaching the second sprocket 51 to the frame 33. The shafts 53, 55 may be rotatably mounted to the side walls 41, 43 of the frame 33 via standard bearings 56 or the like as will now be apparent to those skilled in the art. The sprockets 49, 51 may be standard, off-the-shelf roller chain drive sprockets or the like, keyed or otherwise fixed to the respective shaft 53, 55 substantially centered between the side walls 41, 43.

The sweep conveyor 27 includes a belt, preferably a roller chain 57, passing about the first and second sprockets 49, 51. The roller chain 57 is also preferably an off-the-shelf item, and coacts with the sprockets 49, 51 to form a typical chain drive as will now be apparent to those skilled in the art.

The sweep conveyor 27 includes a plurality of spaced apart paddles 59 attached to the chain 57. Each paddle 59 may be rectangular shaped and is preferably made of rubber. The rubber paddles 59, while somewhat flexible, must be rigid enough to push grain G without excessive flexing. The hood or shroud formed by the frame 33 is preferably shaped and sized so that the paddles 59 are covered except at the opened bottom 45 and mouth 47 thereof to provide a protective cover extending over the top and at least a portion of the sides of the sprockets 49, 51, the chain 57, and the paddles 59 to provide safety and protection as will now be apparent to those skilled in the art. Each paddle 59 is preferably attached to a link of the chain 57 by a rigid connector 61 or the like.

The sweep conveyor 27 includes power means 63 for rotating one of the sprockets 49, 51 to cause the chain 57 to rotate about the first and second sprockets 49, 51 and cause the paddles 59 to sweep grain G from the floor 18 of the grain bin 13 to a well 25 of the grain bin 13. The power means 63 preferably includes a motor 65 and a gear box 67 for reducing the speed or revolutions per minute of the drive or output shaft of the motor 65 and changing the axis of rotation of the drive or output shaft of the motor 65, and a belt drive means 69 or the like for transferring power from the gear box 67 to the first shaft 53. The motor 65 and gear box 67 are preferably mounted on the first end 35 of the frame 33. The belt drive means 69 may include a first pulley or sprocket 71 attached to the drive or output shaft of the gear box 67, a second pulley or sprocket 73 attached to one end of the first shaft 53, and a belt or chain 75 extending between the first and second pulleys 71, 73 so that power from the motor 65 can be transferred to the sprocket 49 to cause the chain 57 and paddles 59 to circle about the sprockets 49, 51 in the direction of the arrows 77 in FIGS. 2 and 4, dragging grain G toward the first end 35 of the frame 33 to a well 25. A protective cover or shroud may be provided over the pulley 71, 73 and belt 75.

The sweep conveyor 27 preferably includes drive means 79 for causing the frame 33 to rotate about the well 25. The drive means 79 may include one or preferably two drive wheels 81 mounted to the second end 37 of the frame 33 for being rotated by the power means 63 and for drivably engaging the floor 18 of the grain bin 13 and/or any grain G supported on the floor 18 of the grain bin 13 to rotate the frame 33 about the well 25. The drive means 79 preferably includes a gear box 83 coupled between the drive wheels 81 and one end of the second shaft 55 for being rotated by the second shaft 55, for reducing the speed or revolutions per minute of the second shaft 55, for changing the axis of rotation, and for rotating the drive wheel 81 in response to the rotation of the first sprocket 49 by the power means 63, etc., as will now be apparent to those skilled in the art.

A receiver means 85 is preferably mounted to the first end 35 of the frame 33 (i.e., to an end wall 46) for mounting to a center pivot stud 87 at or within the well 25 to allow the sweep conveyor 27 to swing about that point. The receiver means 85 is preferably pivotally attached to the end wall 46 in a manner which allows the frame 33 to pivot upwardly relative to the floor 18 of the grain bin 13 and the longitudinal axis of the center pivot stud 87 to parallel the slope of the grain G on the floor 18 of the grain bin 13 (i.e., prior to using the sweep conveyor 27, the grain G will slope upwardly from the well 25 toward the wall structure 17 of the grain bin 13 but as the sweep conveyor 27 is used, the slope of the grain G will become less until the remaining grain G is level with the floor 18).

The discharge conveyor 29 may be of any well known type such as an in-floor auger type discharge conveyor like the auger 16 disclosed in Siemens, U.S. Pat. No. 5,167,318, issued Dec. 1, 1992, incorporated herein by reference.

The operation of the unloading system 11 is similar to other bin clean-out systems such as the one disclosed in Siemens, U.S. Pat. No. 5,167,318, hereinabove referenced, having an screw auger type sweep conveyor and an in-floor screw auger type discharge conveyor. In general, to unload grain G from the grain bin 13, the discharge conveyor 29 is activated and grain G falls through the well or wells 25 by gravity into the discharge conveyor 29 and is conveyed by the discharge conveyor 29 to the discharge point 31 outside the grain bin 13. Once the grain bin 13 is unloaded to a certain level, grain G will stop falling into the well or wells 25 by gravity, but will instead remain on the floor 18 of the grain bin 13 adjacent the well or wells 25, with substantial amounts of grain G remaining between the well or wells 25 and the wall structure 17 of the grain bin 13. Once this happens, the conveyor sweep 27 is moved into the interior 15 of the grain bin 13, the frame 33 is placed on top of the remaining grain G, and the receiver means 85 is coupled to the center pivot stud 87 of the discharge conveyor 29, etc. The motor 65 can then be activated to cause the chain 57 to rotate in the direction of the arrows 77, whereby the paddles 59 will drag or sweep grain G to the well 25. Rotation of the chain 57 will also cause the drive wheels 81 to rotate, whereby the sweep conveyor 27 will slowly rotate about the center pivot stud 87, etc., so that additional grain G will be fed into the mouth 47 of the shroud of the frame 33 for being dragged or swept by the paddles 59 to the well 25. Once all of the grain G within the grain bin 13 has been thus swept into the well 25 and transferred to the discharge point 31, the sweep conveyor 27 can be removed and transferred to another grain bin 13, etc.

Although the present invention has been described and illustrated with respect to a preferred embodiment and a preferred use therefor, it is not to be so limited since modifications and changes can be made therein which are within the full intended scope of the invention.

What is claimed is:

1. An unloading system for a grain bin having an interior for holding a quantity of grain, having a floor within said interior for supporting said quantity of grain, and having a well in said floor for allowing grain to be unloaded from said interior of said grain bin therethrough, said unloading system comprising:

(a) an elongated frame for position on said grain supported on said floor of said grain bin, said frame having a first end and a second end, said first end of said frame being positioned adjacent said well in said floor of said grain bin; said frame including an elongated hood having a top panel, a first side wall, and a second side wall, and an opened bottom;

(b) a first wheel rotatably attached to said frame adjacent said first end of said frame;

(c) a second wheel rotatably attached to said frame adjacent said second end of said frame;

(d) a belt passing about said first and second wheels;

(e) a plurality of spaced apart paddles attached to said belt for engaging grain on said floor of said grain bin through said opened bottom of said hood of said frame; and (f) power means for rotating one of said wheels to cause said belt to rotate about said first and second wheels and cause said paddles to sweep grain from said floor of said grain bin to said well of said grain bin.

2. The unloading system of claim 1 in which said paddles are flexible.

3. The unloading system of claim 1 in which said paddles are rubber.

4. The unloading system of claim 1 in which is included drive means for causing said frame to rotate about said well.

5. The unloading system of claim 4 in which said drive means includes a drive wheel mounted to said second end of said frame for being rotated by said power means and for drivably engaging said floor of said grain bin and any of said grain supported on said floor of said grain bin to cause said frame to rotate about said well.

6. The unloading system of claim 1 in which the lower end of said first side wall of said hood of said frame has an opened mouth for allowing grain to enter said hood.

* * * * *

(12) EX PARTE REEXAMINATION CERTIFICATE (10785th)
United States Patent
Dixon

(10) Number: US 6,499,930 C1
(45) Certificate Issued: Jan. 7, 2016

(54) GRAIN BIN UNLOADING SYSTEM

(75) Inventor: Carl R. Dixon, Weiner, AR (US)

(73) Assignee: SIOUX STEEL COMPANY

Reexamination Request:
No. 90/012,464, Sep. 5, 2012

Reexamination Certificate for:
Patent No.: 6,499,930
Issued: Dec. 31, 2002
Appl. No.: 09/954,519
Filed: Sep. 17, 2001

(51) Int. Cl.
*B65G 65/38* (2006.01)
*B65G 65/00* (2006.01)
*B65G 65/06* (2006.01)
*B65G 69/08* (2006.01)
*B65G 65/42* (2006.01)

(52) U.S. Cl.
CPC .............. *B65G 69/08* (2013.01); *B65G 65/425* (2013.01)

(58) Field of Classification Search
None
See application file for complete search history.

(56) References Cited

To view the complete listing of prior art documents cited during the proceeding for Reexamination Control Number 90/012,464, please refer to the USPTO's public Patent Application Information Retrieval (PAIR) system under the Display References tab.

*Primary Examiner* — Peter C English

(57) ABSTRACT

An unloading system for a grain bin. The unloading system includes a sweep conveyor for sweeping grain from the interior of the grain bin to a well in the floor of the grain bin. The sweep conveyor includes an elongated frame, a first sprocket at one end of the frame, a second sprocket at the other end of the frame, an endless chain extending between the first and second sprockets, a plurality of spaced apart paddles attached to the chain, and a motor for causing the chain to rotate whereby the paddles will drag or sweep grain to the well in the floor of the grain bin.

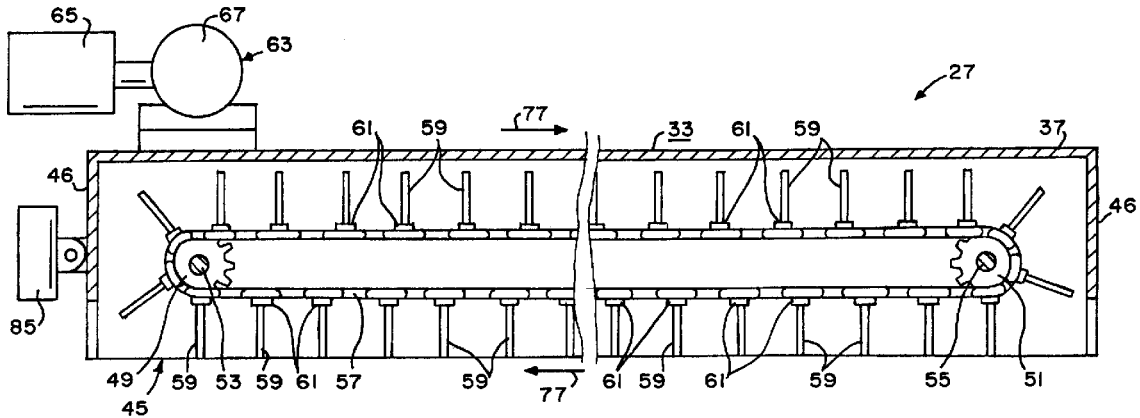

EX PARTE REEXAMINATION CERTIFICATE

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1-6 is confirmed.

New claims 7-21 are added and determined to be patentable.

7. *The unloading system of claim 1 wherein said second side wall has a bottom edge spaced further from said top panel than a bottom edge of said first side wall, said first side wall being positioned adjacent to portions of said spaced apart paddles extending below said belt and moving towards said well when said belt is rotated by said power means, said paddles being configured to sweep grain into said well.*

8. *The unloading system of claim 1 wherein at least one of the paddles extends downwardly from said belt and extends laterally to said belt in a direction substantially parallel to the floor.*

9. *The unloading system of claim 1 wherein at least one of the paddles is configured to contact said floor.*

10. *The unloading system of claim 1 wherein a portion of the plurality of paddles moves over another portion of the paddles.*

11. *The unloading system of claim 1 wherein each of said paddles has a proximal edge and a distal edge with respect to said belt, said proximal edge of each of said paddles extending in opposite directions away from said belt such that each of said proximal edges has a width greater than a width of said belt.*

12. *The unloading system of claim 1, wherein said belt is a chain.*

13. *The unloading system of claim 1, wherein said first end is adapted to pivot around said well of said grain bin.*

14. *An unloading system for a grain bin having an interior for holding a quantity of grain, having a floor within said interior for supporting said quantity of grain, and having a well in said floor for allowing grain to be unloaded from said interior of said grain bin therethrough, said unloading system comprising:*

(a) *an elongated frame for position on said grain supported on said floor of said grain bin, said frame having a first end and a second end, said first end of said frame being positioned adjacent said well in said floor of said grain bin, said frame including an elongated hood having a top panel, a first side wall, and a second side wall, and an opened bottom;*

(b) *a first wheel rotatably attached to said frame adjacent said first end of said frame;*

(c) *a second wheel rotatably attached to said frame adjacent said second end of said frame;*

(d) *a belt passing about said first and second wheels;*

(e) *a plurality of spaced apart paddles attached to said belt for engaging grain on said floor of said grain bin through said opened bottom of said hood of said frame, said first and second side walls extending downwardly from said top panel, said first and second side walls laterally shielding portions of said paddles extending above said belt and positioned between said first and second wheels, said second side wall having a bottom edge spaced further from said top panel than a bottom edge of said first side wall;*

(f) *power means for rotating one of said wheels to cause said belt to rotate about said first and second wheels and cause said paddles to sweep grain from said floor of said grain bin to said well of said grain bin, said first side wall being positioned adjacent to portions of said paddles extending below said belt and moving towards said well when said belt is rotated by said power means, said paddles being configured to sweep grain into said well.*

15. *The unloading system of claim 14 wherein at least one of the paddles extends downwardly from said belt and extends laterally to said belt in a direction substantially parallel to the floor.*

16. *The unloading system of claim 14 wherein at least one of the paddles is configured to contact said floor.*

17. *The unloading system of claim 14 wherein a portion of the plurality of paddles moves over another portion of the paddles.*

18. *The unloading system of claim 14 wherein each of said paddles has a proximal edge and a distal edge with respect to said belt, said proximal edge of each of said paddles extending in opposite directions away from said belt such that each of said proximal edges has a width greater than a width of said belt.*

19. *The unloading system of claim 14 wherein said paddles are flexible.*

20. *The unloading system of claim 14, wherein said belt is a chain.*

21. *The unloading system of claim 14, wherein said first end is adapted to pivot around said well of said grain bin.*

\* \* \* \* \*